(12) United States Patent
Newman

(10) Patent No.: US 6,561,497 B2
(45) Date of Patent: May 13, 2003

(54) BIOREMEDIATION SYSTEM

(76) Inventor: William A. Newman, 6712 W. River Rd., Brooklyn Center, MN (US) 55430

( * ) Notice: Subject to any disclaimer, the term of this patent is extended or adjusted under 35 U.S.C. 154(b) by 24 days.

(21) Appl. No.: 09/949,466

(22) Filed: Sep. 7, 2001

(65) Prior Publication Data

US 2002/0046972 A1 Apr. 25, 2002

Related U.S. Application Data

(60) Provisional application No. 60/237,833, filed on Oct. 3, 2000.

(51) Int. Cl.$^7$ ............................................. B01D 47/10
(52) U.S. Cl. .................. 261/76; 261/78.1; 261/115; 261/116; 261/DIG. 54; 210/241; 210/610
(58) Field of Search .................. 261/76, 78.1, 115, 261/116, DIG. 54; 210/241, 610

*Primary Examiner*—Chester T. Barry
(74) *Attorney, Agent, or Firm*—Bernd W. Sandt

(57) ABSTRACT

The present invention provides a system and method of bioremediation by mixing a gas and in particular a high oxygen content low pressure gaseous stream with water at a higher pressure, dissolving the gas in the water at elevated pressures by subdividing the water into fine droplets and thereafter injecting such water into soil containing contaminated groundwater.

8 Claims, 1 Drawing Sheet

BIOREMEDIATION SYSTEM

This application claims the benefit of U.S. provisional application Ser. No. 60/237,833, filed Oct. 3, 2000.

The present invention relates to a bioremediation system and method for use in cleaning up water containing organic contaminants. More specifically the present invention relates to cleaning up groundwater containing organic contaminants by injecting a gas-containing water into soil and thereby catalyzing and accelerating the rate at which microorganisms in the soil biodegrade such organic contaminants into non-polluting components such as carbon dioxide and water.

It is an object of this invention to provide a bioremediation system and method by providing a low cost, reliable, continuously operating and transportable unit which can be readily taken to treatment sites for cleaning up groundwater or other water sources containing organic contaminants using a gas-enriched and particularly oxygen-enriched water.

SUMMARY OF THE INVENTION

The present invention is based on the concept of contacting gas-enriched and particularly oxygen-enriched water with groundwater containing organic contaminants by injecting such into soil to increase the microbial action causing the biodegradation and/or mineralization of such organic contaminants into non-polluting components. The action of such microorganisms is further enhanced by adding nutrients for such microorganisms to the gas-enriched water, principally in the form of soluble nitrogen and phosphorus compounds such as are found in fertilizer compositions.

In one form of the present invention, a low pressure oxygen stream containing at least 90% oxygen is combined with water at higher pressures in a fluid mixing device and then sprayed under pressure into a chamber under conditions that result in extremely small water particles which allows for maximum solution of oxygen in the water and thereafter pumping the oxygenated water into the ground containing soil contaminants. The principal type of organic contaminants remediated are hydrocarbons and halogenated hydrocarbons. In a preferred embodiment the water is combined with nutrients to further enhance the microbial activity before it is sprayed into the chamber.

DESCRIPTION OF THE DRAWINGS

Attached FIG. 1

DETAILED DESCRIPTION OF THE INVENTION

Figure 1:
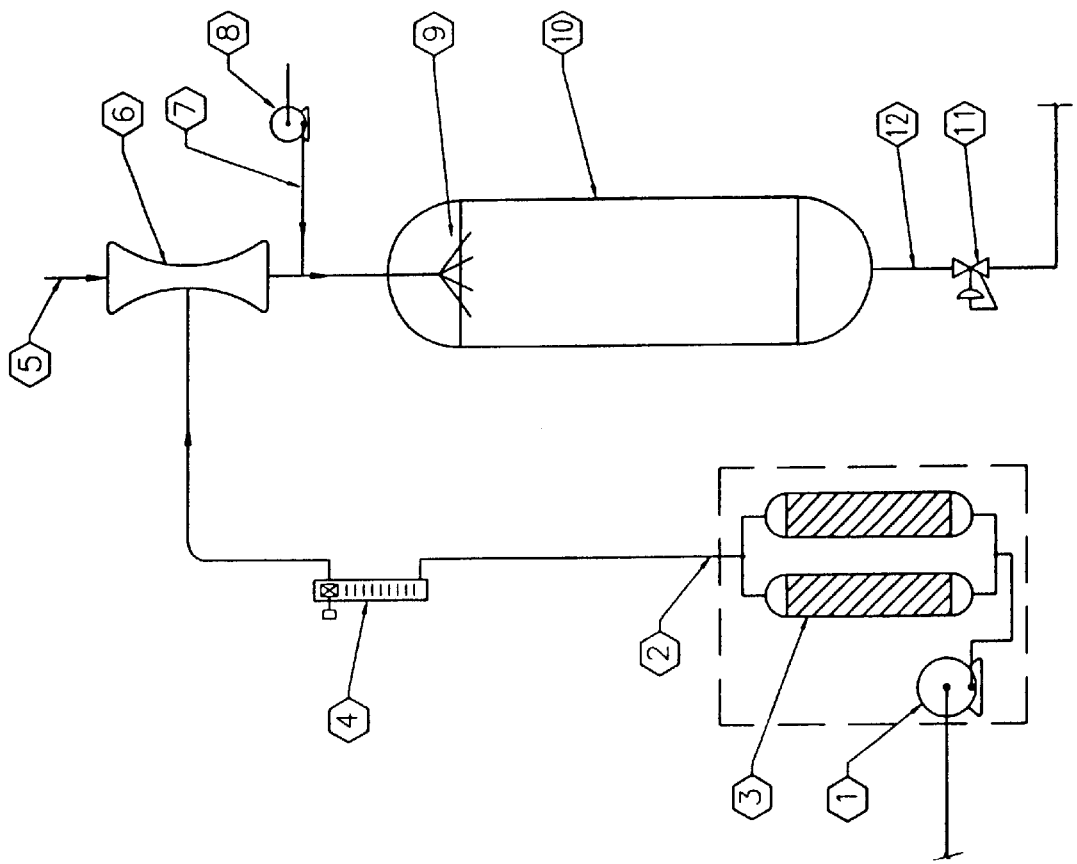

In the system of the present invention as shown in FIG. 1, air is pressurized (1) and converted into an almost pure oxygen stream (2) using molecular sieve beds (3). Systems which generate low pressure oxygen streams containing 90% or more of oxygen based on molecular sieves, generally referred to as pressure swing adsorption generators, are commercially available from such companies as Air Sep. Such units deliver oxygen streams at pressures up to 15 psig and rates of 10–12 standard cubic feet per hour (SFH). The oxygen supply to the water is controlled by means of a needle valve and flow rotameter (4).

Although oxygen generators which give rise to lower concentration oxygen streams can be used, it will be apparent that a higher oxygen content in the gas mixed with the water will result in a higher oxygen concentration in the water and hence in more effective decontamination of the groundwater. Oxygen at higher pressures such as is obtained from compressed oxygen tanks or liquid oxygen can be passed through regulator valves and used in the process of the present invention, but high pressure oxygen is more dangerous and more likely to ignite or explode. Oxygen from such sources is also more expensive and poses increased maintenance and handling problems because of the weight of the containers and the number required to assure continuous operation. On site generators of oxygen are lighter and provide a continuous stream of oxygen without requiring off-site regeneration.

The low pressure oxygen stream is injected into water at a pressure 30 to 70 psig (5). In order to achieve such it is of course necessary to create a vacuum at the mixing point. This is achieved in the present invention by using a Venturi (6). In operation the water must be injected at a sufficient rate to account for the pressure differential and draw the oxygen at the desired rate into the water. The Venturi also achieves an intimate mixing of the oxygen and water. For example adding 10 SCFH of oxygen to water at 15 psig requires the addition of approximately 30 gallons of water per minute at 50 psig for the most effective operation. It is not necessary to use pure or clean water for the process.

The water/oxygen mixture formed in the venturi (6) is then preferably combined with a nutrient stream (7), which must be carefully monitored so as to add only the desired amounts of nutrient. The right amount will aid in the biodegradation whereas excess amounts can add to the contamination. Fertilizer compositions containing dissolvable nitrogen and phosphorus are suitable for such purposes. Exact feeding of the nutrient stream can be accomplished by such means as a peristaltic metering pump (8). The resulting stream is then fed through a spray nozzle (9) into a pressurized spray chamber (10) in which the water of the stream is divided into fine droplets, which allows for maximum solution of the oxygen in the water. Preferably the water should be subdivided into droplets where the majority have diameters of less than 3 mm. As the water falls through the chamber it is in contact with an oxygen atmosphere which aids in the solution of the oxygen. As a result of the pressure injection through the nozzle oxygen bubbles are formed and foaming occurs resulting in further mixing of the oxygen and water. In general the chamber is designed to allow a maximum of oxygen to become dissolved in the water, i.e., reach equilibrium or get as close to such as is economically feasible. The chamber is maintained under pressure by means of a pressure control valve (11) at the exit of the chamber (12). Suitable pressures are generally in the range of 10 to 30 psig.

Suitable spray nozzles are known in the art one such nozzle being Bete TF 40 spiral cone nozzle. The initial water pressure must be such as to take into account the water pressure drop across the nozzle and the desired pressure in the chamber. One suitable chamber design involves the use of a large diameter clear plastic pipe made from PVC or polycarbonate. This allows the operator of the equipment to observe the operation of the nozzle and notice any fouling of the nozzle. The latter becomes particularly important when impure feed water is used.

Figure 2:
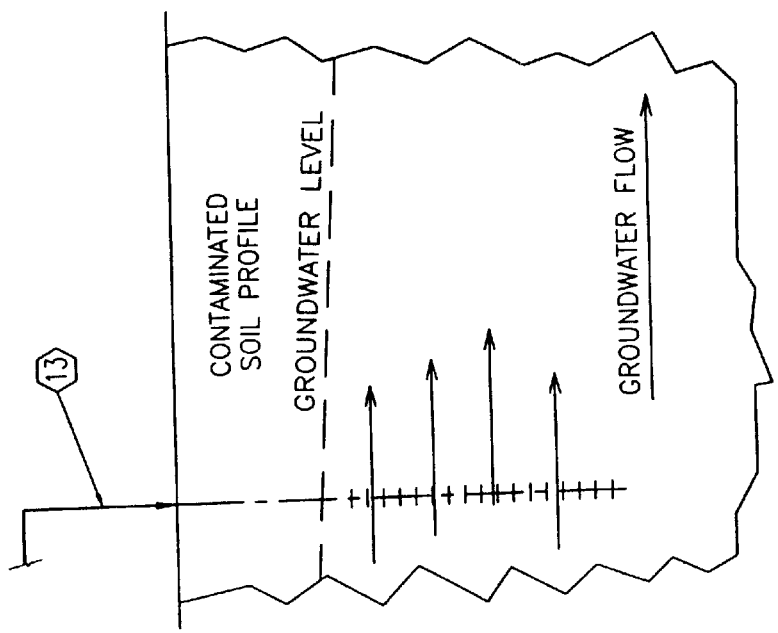
FIG. 2 shows a schematic arrangement of the system of the present invention.

The water (13) exiting the pressure control valve can then be directly injected into the ground for remediation of the soil or groundwater (FIG. 2). The system of the present invention, when operated at a chamber pressure of one atmosphere above ambient, will result in dissolved oxygen values of 30–40 mg/L although this value can be increased to above 50 mg/L at higher pressures.

The present invention offers a simple compact design that can be incorporated into a single structural unit which can be readily transported to any location where there is a need for bioremediation. The present invention further provides an increased safety factor by providing a continuous supply of low pressure oxygen.

It should be apparent that the system of the present invention may be modified without departing from the concept of the invention. Thus it is possible to employ more than one oxygen addition means for a single spray chamber. Spray chambers may be equipped with multiple nozzles for the addition of the water/oxygen mixture. Under certain operating situation, particularly for long continuous operation it may be desirable to provide dual spray chambers so that one chamber can be taken out of operation for maintenance while the unit continues to supply oxygenated water for the remediation. It should also be understood that the system of the present invention can similarly be applied to contaminated water found in ponds, industrial reservoirs above ground tanks and other above ground structures.

EXAMPLE 1

Using the design described in the attached FIG. 1 in Minnesota, water at a pressure of about 30 to 35 psi was passed into a Mazzei venturi nozzle at the rate indicated in the table below. At the Venturi the water was mixed with oxygen at a rate of about 16 standard cubic feet per hour (SCFH) generated by two pressure swing adsorption generators. To the resulting water oxygen mixture was then added a nutrient stream of dissolved fertilizer containing 0.5 mg/l of phosphorus and 2.0 mg/ of nitrogen at a rate of approximately 0.5 gallons per day. The resulting mixture is sprayed through the spray nozzles indicated in the table below into the spray chamber comprising a five-ft. long clear PVC pipe having the indicated diameter. The water out of the spray chamber was tested by means of a Sonde device to measure dissolved oxygen by means of dissolved oxygen electrodes, water temperature and specific conductance in millisiemens. The results of these measurements are shown in the table below.

TABLE I

Oxygenation System Performance
Bete TF48 Nozzle & 8-inch Chamber
Minnesota System

| Flow gpm | Dissolved Oxygen mg/L | GLC Chamber psig | Temp Degrees Celcius | Specific Cond. mS |
|---|---|---|---|---|
| 21.1 | 35.09 | 14.0 | 11.33 | 0.441 |
| 25.6 | 34.23 | 14.0 | 11.07 | 0.427 |
| 26.5 | 36.90 | 14.5 | 11.53 | 0.428 |
| 27.0 | 35.00 | 13.0 | 11.57 | 0.398 |
| 30.8 | 33.12 | 14.5 | 11.46 | 0.465 |
| 30.9 | 35.90 | 14.0 | 11.07 | 0.449 |
| 31.0 | 31.45 | 15.0 | 11.19 | 0.451 |
| 31.0 | 30.58 | 15.0 | 11.27 | 0.400 |
| 35.0 | 35.36 | 14.0 | 10.93 | 0.417 |
| 35.0 | 37.31 | 14.0 | 11.33 | 0.446 |
| 35.8 | 29.78 | 15.0 | 10.82 | 0.422 |
| 36.8 | 30.86 | 15.0 | 10.87 | 0.340 |
| 37.0 | 33.20 | 15.0 | 10.62 | 0.328 |
| 37.0 | 32.10 | 14.5 | 11.15 | 0.338 |
| 39.1 | 43.38 | 17.0 | 10.92 | 0.361 |
| 40.0 | 40.03 | 17.0 | 10.70 | 0.418 |

*Dissolved oxygen, temperature, and specific conductance were measured with a flow-cell and YSI 600 xlm sonde.

Using the foregoing system, ground water containing approximately 1000 ppb of pentachlorophenol was purified to a the point that no pentachlorophenol could be detected after operating the unit for approximately 1.5 years.

EXAMPLE II

The same system as described in Example 1, except that the diameter of the chamber pipe was 6 inches, was used in Michigan at the rates and with the results indicated in the Table II below. Dissolved oxygen content was measured by the Winkler titration method.

TABLE II

Oxygenation System Performance
Bete TF40 Nozzle & 6-inch Chamber
Michigan System

| Flow Rate gpm | GLC Chamber Pressure psig | Dissolved Oxygen mg/L Winkler |
|---|---|---|
| 25.65 | 4.0 | 37.50 |
| 25.21 | 5.0 | 40.70 |
| 25.02 | 10.0 | 44.00 |
| 25.40 | 15.0 | 42.50 |
| 25.51 | 20.0 | 42.80 |
| 25.40 | 25.0 | 42.90 |
| 25.15 | 30.0 | 36.60 |

*At system start-up temperature was 15.12 Degrees Celcius and Specific Conductance was 0.837 mS Measurements of the effectiveness of the foregoing system have demonstrated that water containing about 5 milligrams per liter of dissolved oxygen, contained about 9 mg/l of dissolved oxygen after mixing in the Venturi and 35 to 40 mg/l of dissolved oxygen after having gone through the spray chamber.

The system of the present invention has been principally described with respect to the use of oxygen enriched water to serve as an electron acceptor in the aerobic biodegradation of organic contaminants. However, it is to be understood that the system can be similarly employed to deliver other gases that are electron acceptors in the aerobic biodegradation of organic contaminants. The process can also be used to deliver gases that are electron donors to stimulate biodegradation of organic contaminants such as selected chlorinated solvents. Molecular hydrogen, methane and propane are examples of other gaseous substances that can be delivered by this system. Thus hydrogen-enriched water can be employed in the system of the present invention for the biodegradation of chlorinated compounds such as perchloroethylene. The system is also useful in the cometabolic biodegradation of chlorinated compounds in which a mixture of oxygen and a gaseous hydrocarbon, such as methane or propane, is contacted with the contaminated groundwater in the soil.

What is claimed is:

1. A bioremediation system comprising means for generating a low pressure gas stream containing at least 90% of said gas at low pressures, means for admixing the gas with water at higher pressures and means for dissolving the gas mixed with the water by subdividing the water into fine droplets and exposing such droplets to the gas under pressure for sufficient time to increase the gas content of the water.

2. A bioremediation system comprising means for generating an oxygen stream containing at least 90% oxygen at low pressures, means for admixing said oxygen with water at higher pressures and means for dissolving the oxygen mixed with the water by subdividing the water into fine droplets and exposing such droplets to oxygen under pressure for sufficient time to increase the oxygen content of the water.

3. The bioremediation system of claim 2 wherein a nutrient supply is added to the water after the addition of the oxygen and before the oxygen dissolving means.

4. The bioremediation system of claim 2 wherein the oxygen is combined with a gaseous hydrocarbon for aerobic cometabolic bioremediation.

5. The bioremediation system of claim 2 wherein the oxygen generator is a pressure swing adsorption generator and the mixing of the oxygen and the water is accomplished by means of a venturi.

6. The bioremediation system of claim 2 wherein the all elements of the system are mounted on a single transportable frame.

7. The bioremediation system of claim 1 wherein the solution of the gas in the water is accomplished by means of a spray chamber.

8. The bioremediation system of claim 4 wherein the hydrocarbon is methane, ethane, propane or mixtures thereof.

* * * * *